(12) United States Patent
Jackson

(10) Patent No.: US 9,592,797 B2
(45) Date of Patent: Mar. 14, 2017

(54) WHEEL WELL ICE BUILDUP REMOVAL ASSEMBLY

(71) Applicant: Stephen Jackson, Gananoque (CA)

(72) Inventor: Stephen Jackson, Gananoque (CA)

( * ) Notice: Subject to any disclaimer, the term of this patent is extended or adjusted under 35 U.S.C. 154(b) by 70 days.

(21) Appl. No.: 14/663,700

(22) Filed: Mar. 20, 2015

(65) Prior Publication Data

US 2016/0272166 A1    Sep. 22, 2016

(51) Int. Cl.
*B60S 3/04*      (2006.01)
*F25C 5/04*      (2006.01)
*B25G 1/00*      (2006.01)
*B02C 19/00*     (2006.01)

(52) U.S. Cl.
CPC .............. *B60S 3/045* (2013.01); *B25G 1/00* (2013.01); *B02C 19/0087* (2013.01); *F25C 5/043* (2013.01)

(58) Field of Classification Search
CPC ... A47L 13/02; A47L 13/022; B02C 19/0087; F25C 5/043; B60S 3/045
See application file for complete search history.

(56) References Cited

U.S. PATENT DOCUMENTS

| | | | | |
|---|---|---|---|---|
| 101,424 A * | 4/1870 | Brown | ...................... | F25C 5/043 |
| | | | | 30/164.6 |
| 1,424,221 A * | 8/1922 | Trumpeter | .............. | F25C 5/043 |
| | | | | 30/162 |
| 2,061,265 A * | 11/1936 | Yeomans | ................ | F25C 5/043 |
| | | | | 241/100 |
| 2,135,404 A * | 11/1938 | Lofstrand, Sr. | ..... | B02C 19/0087 |
| | | | | 241/99 |
| 3,071,994 A | 1/1963 | Swenson | | |
| 3,399,928 A | 9/1968 | Robbins | | |
| 4,002,366 A * | 1/1977 | Hammes | ................. | F25C 5/043 |
| | | | | 294/26 |
| 5,791,056 A * | 8/1998 | Messina | ................. | A62B 3/005 |
| | | | | 30/361 |
| 6,009,626 A * | 1/2000 | Lei | .......................... | F25C 5/043 |
| | | | | 30/164.5 |
| D492,178 S * | 6/2004 | Wright | ............................ | D8/70 |
| 7,293,361 B1 | 11/2007 | Miller | | |
| D598,724 S | 8/2009 | Hsieh | | |
| 8,122,619 B2 | 2/2012 | Embry | | |
| 8,925,840 B2 * | 1/2015 | Matsuo | .................... | B02C 1/12 |
| | | | | 241/30 |
| 9,206,569 B1 * | 12/2015 | Roy | ......................... | B25D 1/16 |
| 2005/0211452 A1 | 9/2005 | Andersen | | |
| 2012/0103644 A1 | 5/2012 | Walsh et al. | | |

\* cited by examiner

*Primary Examiner* — Randall Chin

(57) ABSTRACT

A wheel well ice buildup removal assembly includes a cylinder having a first end, a second end and a perimeter wall. The first and second ends each have an opening extending therethrough. A rod extends through the first end and has an outer end positioned outside of the cylinder and an inner end positioned in the cylinder. A head is attached to the inner end and has a distal end that is pointed extending outwardly of the second end. The distal end is positionable in a retracted condition positioned within the cylinder and a deployed condition positioned outside of the cylinder. A spring is mounted within the cylinder and biases the head away from the first end and outwardly of the second end. The rod is pulled outwardly away from the first end and released to cause the head to forcibly extend from the cylinder.

6 Claims, 5 Drawing Sheets

WHEEL WELL ICE BUILDUP REMOVAL ASSEMBLY

BACKGROUND OF THE DISCLOSURE

Field of the Disclosure

The disclosure relates to ice buildup removal devices and more particularly pertains to a new ice buildup removal device for preventing damage to a wheel by ice buildup in a wheel well.

SUMMARY OF THE DISCLOSURE

An embodiment of the disclosure meets the needs presented above by generally comprising a cylinder having a first end, a second end and a perimeter wall extending between the first and second ends. The first and second ends each have an opening extending therethrough. A rod has an outer end positioned outside of the cylinder and an inner end positioned in the cylinder. The rod extends through the opening in the first end. A head is attached to the inner end and has a distal end with respect to the rod. The distal end is pointed and is extendable through the opening in the second end. The distal end is positionable in a retracted condition positioned within the cylinder and a deployed condition positioned outside of the cylinder and extending away from the second end. A spring is mounted within the cylinder and extends between and abuts the head and the first end. The spring biases the head away from the first end and outwardly of the second end. The rod is pulled outwardly away from the first end and released to cause the head to forcibly extend from the cylinder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
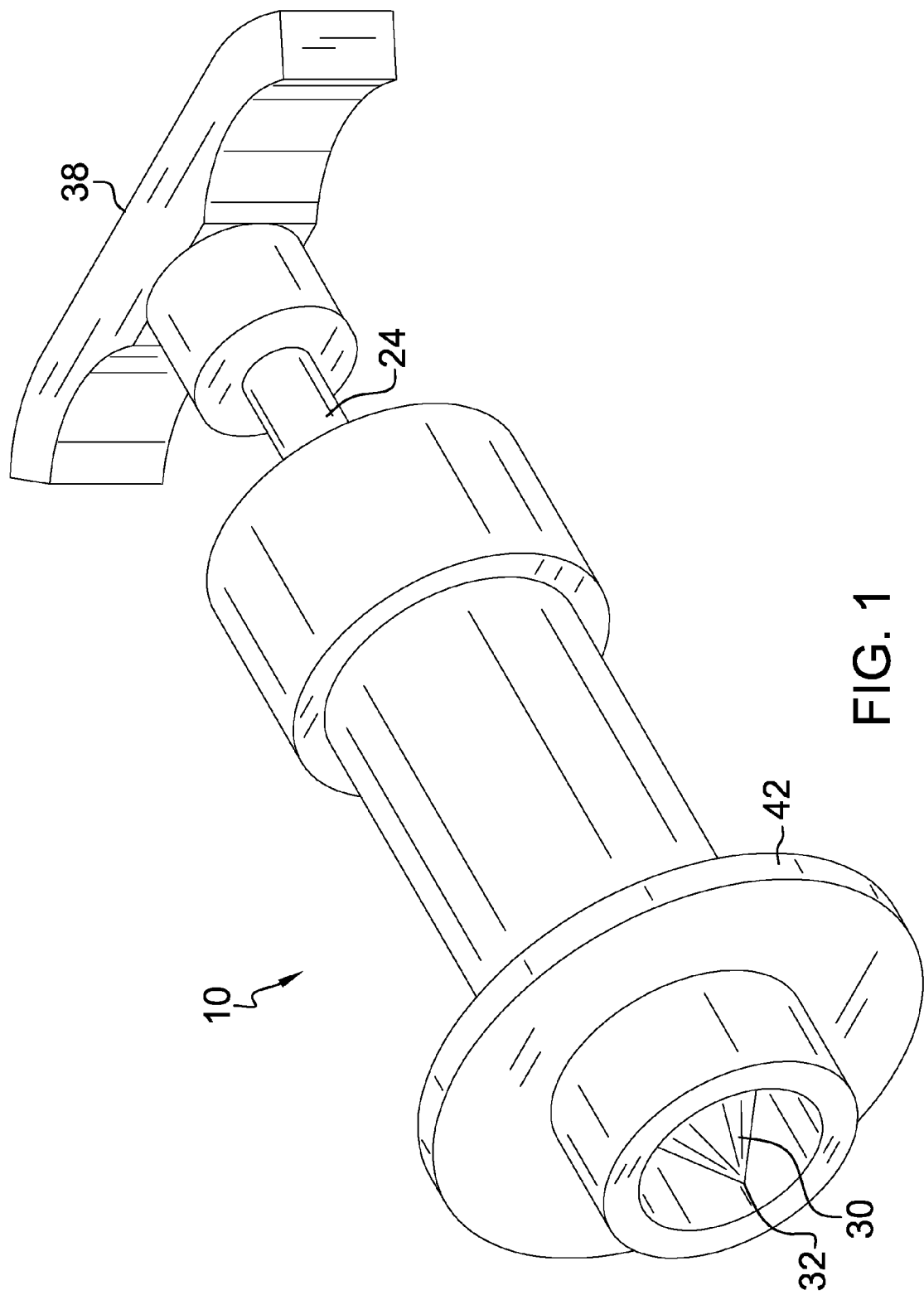
FIG. 1 is a front perspective view of a wheel well ice buildup removal assembly according to an embodiment of the disclosure.
Figure 2:
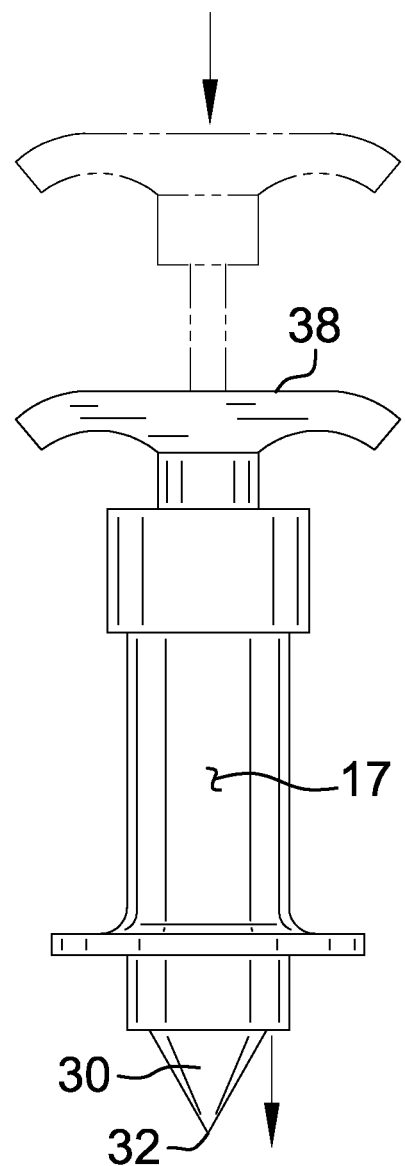
FIG. 2 is a front view of an embodiment of the disclosure.
Figure 3:
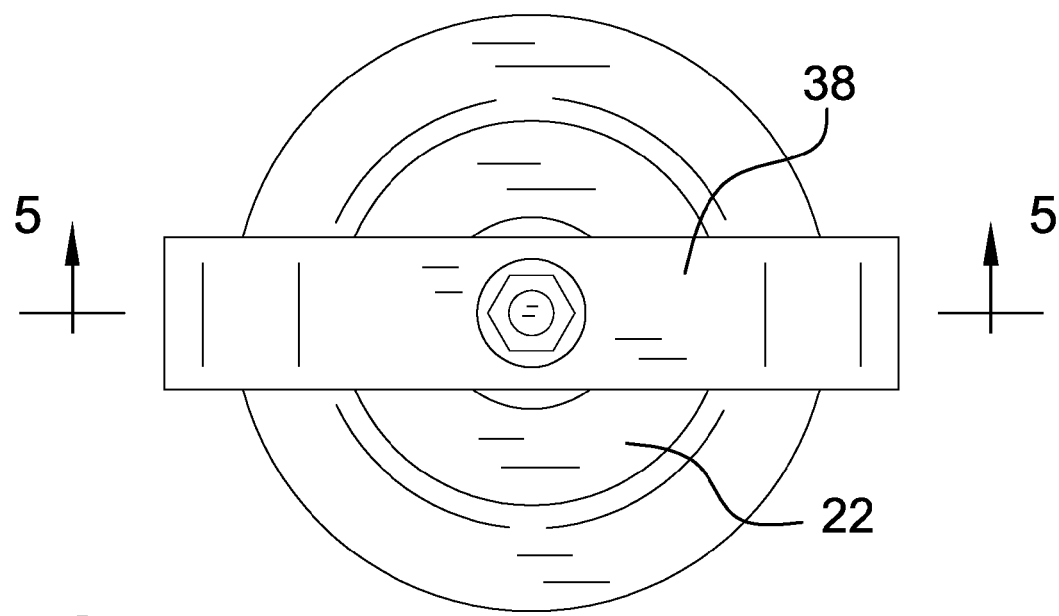
FIG. 3 is a rear view of an embodiment of the disclosure.
Figure 4:
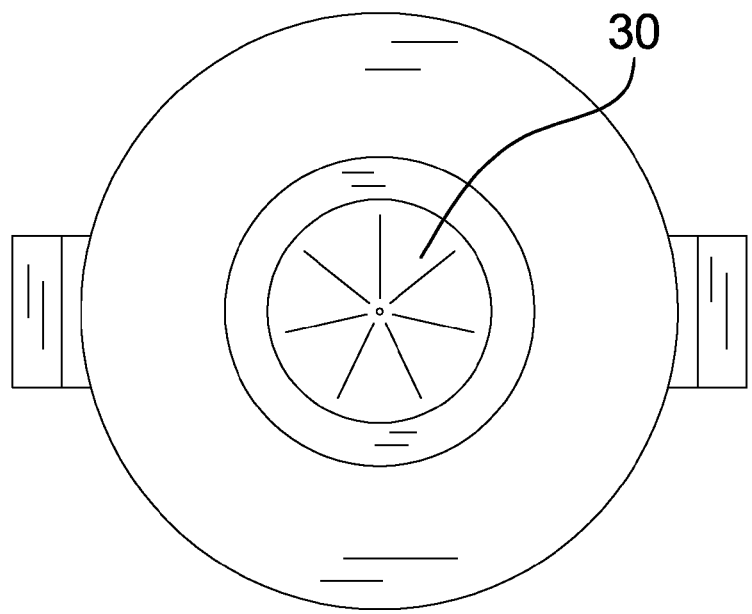
FIG. 4 is a front view of an embodiment of the disclosure.
Figure 5:
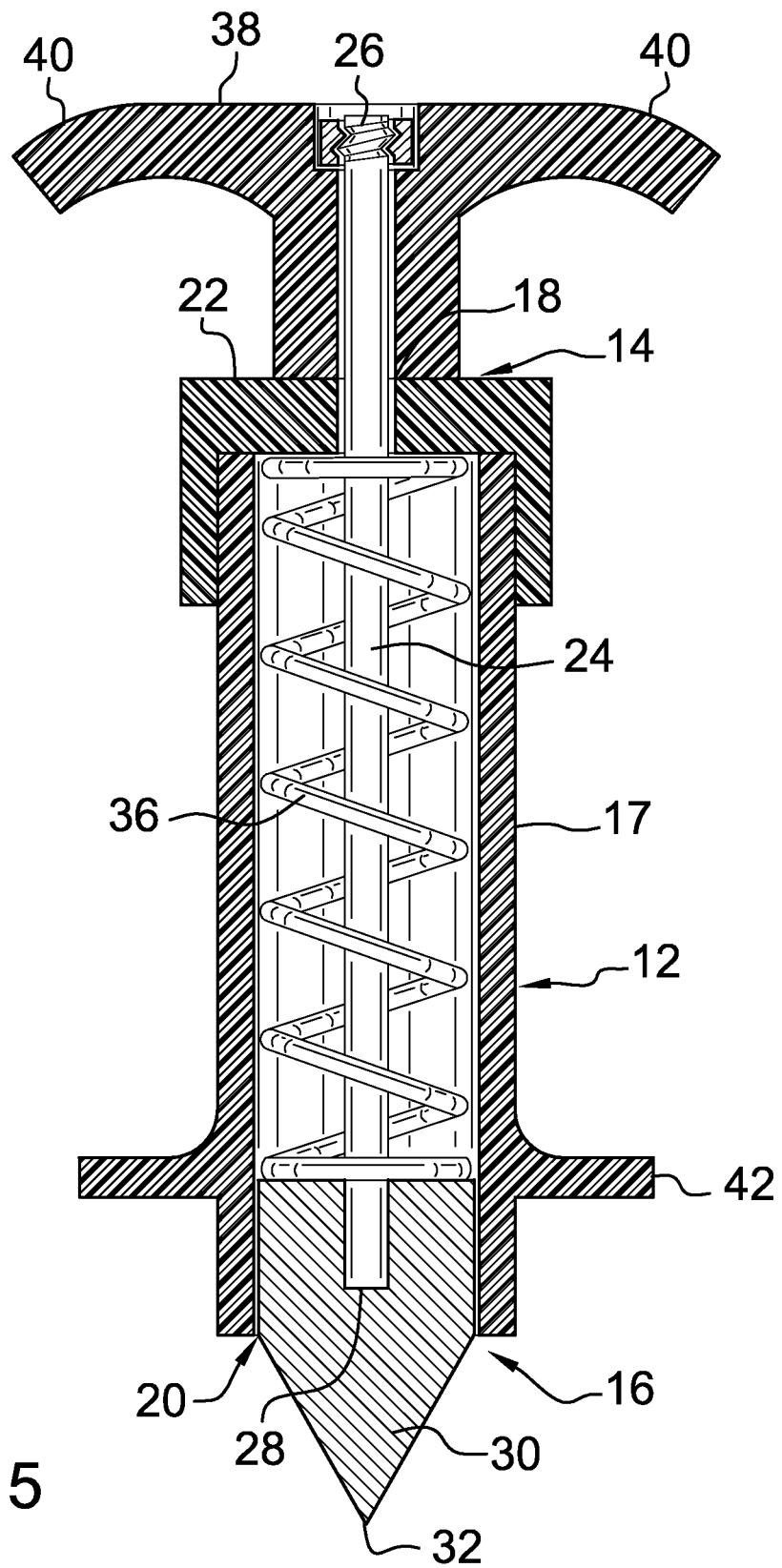
FIG. 5 is a cross-sectional view of an embodiment of the disclosure taken along line 5-5 of FIG. 3.
Figure 6:
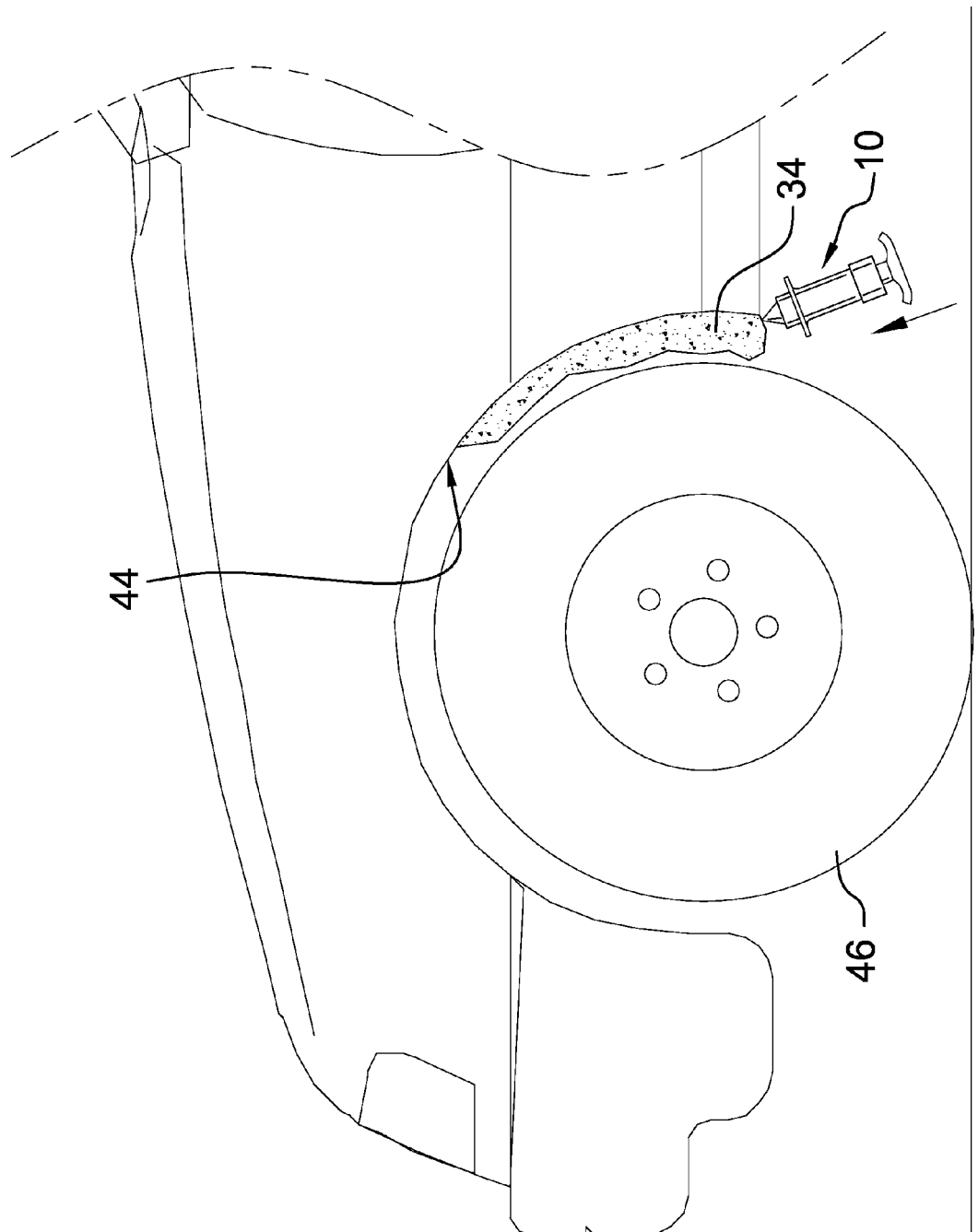
FIG. 6 is a front in-use view of an embodiment of the disclosure.

With reference now to the drawings, and in particular to FIGS. 1 through 6 thereof, a new ice buildup removal device embodying the principles and concepts of an embodiment of the disclosure and generally designated by the reference numeral 10 will be described.

As best illustrated in FIGS. 1 through 6, the wheel well ice buildup removal assembly 10 generally comprises a cylinder 12 that has a first end 14, a second end 16 and a perimeter wall 17 extending between the first 14 and second 16 ends. The first 14 and second 16 ends each have an opening 18, 20, respectively, extending therethrough. As can be seen best in FIG. 5, the first end 14 may be formed of a wall 22 which has been permanently or removably attached to perimeter wall 17 while the second end 16 may be completely without a wall structure. The distance from the first end 14 to the second end 16 may be between 4.0 inches and 8.0 inches and the cylinder 12 may have a diameter between 1.0 and 3.0 inches.

A rod 24 has an outer end 26 positioned outside of the cylinder 12 and an inner end 28 positioned in the cylinder 12. The rod 24 extends through the opening 18 in the first end 14. The rod 24 may be comprised of a metallic material such as steel and may share a longitudinal axis with the cylinder 12.

A head 30 is attached to the inner end 28 and has a distal end 32 with respect to the rod 24. The distal end 32 is pointed and is extendable through the opening 20 in the second end 16. The distal end 32 is positionable in a retracted condition positioned within the cylinder 12 and a deployed condition positioned outside of the cylinder 12 and extending away from the second end 16. Thus, when in the deployed position, the distal end 32 may engage compacted ice and snow buildup 34. The head 30 is comprised of a rigid, durable material such as steel or other metal. The head 30 may have a conical shape to further strengthen the head. More particular, the head 30 may have an outer portion having the conical shape which transitions to a cylindrical shape generally matching a size and shape of an interior of the cylinder 12.

A spring 36 is mounted within the cylinder 12 and extends between and abuts the head 30 and the first end 14. The spring 36 biases the head 30 away from the first end 14 and outwardly of the second end 16. The rod 24 is pullable outwardly away from the first end 14 and released to cause the head 30 to forcibly extend from the cylinder 12. That is, the rod 24 is released to allow the spring 36 to cause the head 30 to snap from the retracted condition to the deployed condition with great force. A handle 38 may be attached to the outer end 26 of the rod 24 to facilitate urging of the outer end 26 away from the first end 14. The handle 38 includes a pair of wings 40 forming finger holds. To further facilitate drawing of the outer end 26 of the rod 24 away from the cylinder 12, a grip 42 may be attached to an outer surface of the cylinder 12. The grip 42 is positioned adjacent to the second end 16 of the cylinder 12. The grip 42 may extend completely around the cylinder 12 and be disc shaped having a planar upper and lower side.

In use, when a user has a large amount of snow and ice buildup 34 in a wheel well 44 behind a tire 46, the user may wish to remove it so that it does no fall off when traveling at high speeds and to prevent wear to the tire 46 should the buildup contact the tire 46. The user will position the second end of the cylinder 12 adjacent to the buildup 34, such as at a juncture of the buildup and the wheel well 44, and pull the head 30 to the retracted condition. The rod 24 is then released to allow the distal end 32 of the head 30 to strike the buildup 34 and cause it to break away from the wheel well 44. This action may be repeated until all or a sufficient amount of the buildup 34 has been removed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ice removal assembly configured for removing ice from a wheel well of a vehicle, said assembly comprising:
   a cylinder having a first end, a second end and a perimeter wall extending between said first and second ends, said first and second ends each having an opening extending therethrough;
   a rod having an outer end positioned outside of said cylinder and an inner end positioned in said cylinder, said rod extending through said opening in said first end;
   a head being attached to said inner end, said head having a distal end with respect to said rod, said distal end being pointed and being extendable through said opening in said second end, said distal end being positionable in a retracted condition positioned within said cylinder and a deployed condition positioned outside of said cylinder and extending away from said second end;
   a spring being mounted within said cylinder and extending between and abutting said head and said first end, said spring biasing said head away from said first end and outwardly of said second end, wherein said rod is pullable outwardly away from said first end and released to cause said head to forcibly extend from said cylinder; and
   a grip being attached to an outer surface of said cylinder, said grip being positioned adjacent to said second end of said cylinder, said grip having an upper side and a lower side, each of said upper side and said lower side being planar wherein said grip is planar, disc shaped, and oriented perpendicular to said cylinder.

2. The ice removal assembly according to claim 1, wherein said head has a conical shape.

3. The ice removal assembly according to claim 1, further including a handle being attached to said outer end of said rod to facilitate urging of said outer end away from said first end.

4. The ice removal assembly according to claim 3, wherein said handle includes a pair of wings forming finger holds.

5. The ice removal assembly according to claim 1, wherein said grip extends completely around said cylinder.

6. An ice removal assembly configured for removing ice from a wheel well of a vehicle, said assembly comprising:
   a cylinder having a first end, a second end and a perimeter wall extending between said first and second ends, said first and second ends each having an opening extending therethrough;
   a rod having an outer end positioned outside of said cylinder and an inner end positioned in said cylinder, said rod extending through said opening in said first end;
   a head being attached to said inner end, said head having a distal end with respect to said rod, said distal end being pointed and being extendable through said opening in said second end, said distal end being positionable in a retracted condition positioned within said cylinder and a deployed condition positioned outside of said cylinder and extending away from said second end, said head having a conical shape;
   a spring being mounted within said cylinder and extending between and abutting said head and said first end, said spring biasing said head away from said first end and outwardly of said second end, wherein said rod is pullable outwardly away from said first end and released to cause said head to forcibly extend from said cylinder;
   a handle being attached to said outer end of said rod to facilitate urging of said outer end away from said first end, said handle including a pair of wings forming finger holds; and
   a grip being attached to an outer surface of said cylinder, said grip being positioned adjacent to said second end of said cylinder, said grip extending completely around said cylinder, said grip having an upper side and a lower side, each of said upper side and said lower side being planar wherein said grip is planar, disc shaped, and oriented perpendicular to said cylinder.

\* \* \* \* \*